United States Patent
Conway et al.

[11] Patent Number: 5,899,415
[45] Date of Patent: May 4, 1999

[54] PERSONNEL GUIDED AERIAL DELIVERY DEVICE

[76] Inventors: Robert Conway, 736 Alfred Dr., Orlando, Fla. 32810; Edward Strong, 6659 Lake Cane Dr., Orlando, Fla. 32819

[21] Appl. No.: 08/818,495

[22] Filed: Mar. 14, 1997

[51] Int. Cl.⁶ ...................................................... B64D 1/08
[52] U.S. Cl. ..................... 244/152; 244/138 R; 244/142; 242/388.7; 242/390.9
[58] Field of Search ................................ 242/152, 138 R, 242/142, 195, 151 R, 904, 107, 233, 388.6, 388.7, 390.9

[56] References Cited

U.S. PATENT DOCUMENTS

| | | |
|---|---|---|
| 3,387,805 | 6/1968 | Barnett et al. . |
| 4,283,020 | 8/1981 | Bauer et al. . |
| 4,342,437 | 8/1982 | Farinacci . |
| 4,379,615 | 4/1983 | Toda et al. . |
| 4,720,064 | 1/1988 | Herndon . |
| 4,799,914 | 1/1989 | Hutchinson . |
| 4,964,599 | 10/1990 | Farineau ................................... 244/195 |
| 5,678,788 | 10/1997 | Hetzer et al. . |

FOREIGN PATENT DOCUMENTS

| | | | |
|---|---|---|---|
| 794320 | 11/1934 | France ..................................... 244/142 |
| 912299 | 10/1958 | United Kingdom ................... 244/152 |
| 1172573 | 5/1968 | United Kingdom ................... 244/152 |

*Primary Examiner*—Charles T. Jordan
*Assistant Examiner*—Tien Dinh
*Attorney, Agent, or Firm*—Malin, Haley, DiMaggio & Crosby, P.A.

[57] ABSTRACT

A personnel guided aerial delivery device is disclosed which can be used to safely and precisely deliver personnel, cargo, or a combination of both from an aircraft in flight, to a precise target or location. In the preferred embodiment, the aerial delivery device generally consists of a large "ram-air" type gliding parachute, a "drogue" parachute, an encapsulated crew module, a "fly-by-wire" control system, and a landing impact attenuation system. The aerial delivery device can employ an onboard human pilot to navigate the module. The use of a skilled pilot allows the aerial delivery device to be guided to a designated landing site.

29 Claims, 9 Drawing Sheets

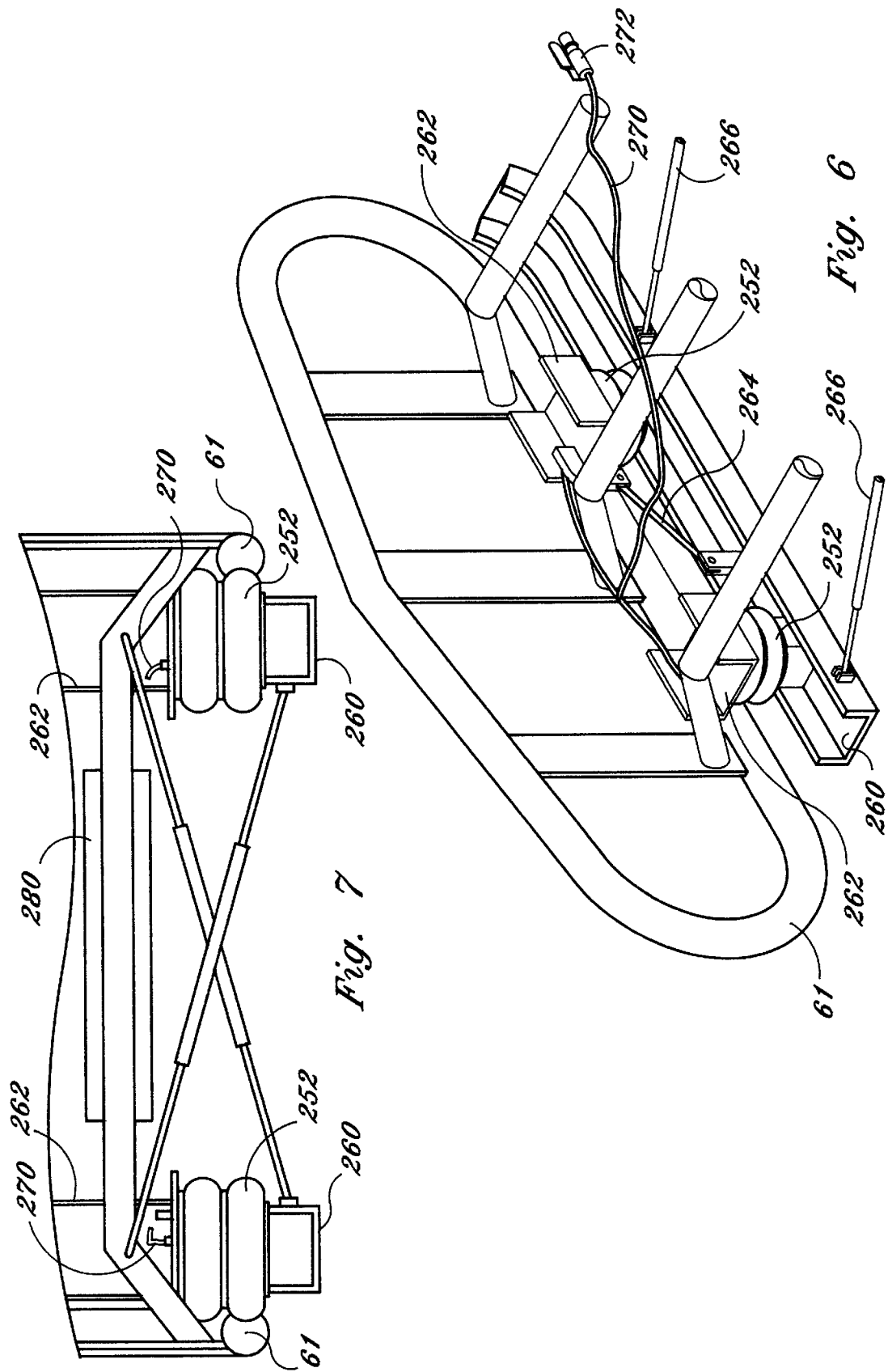

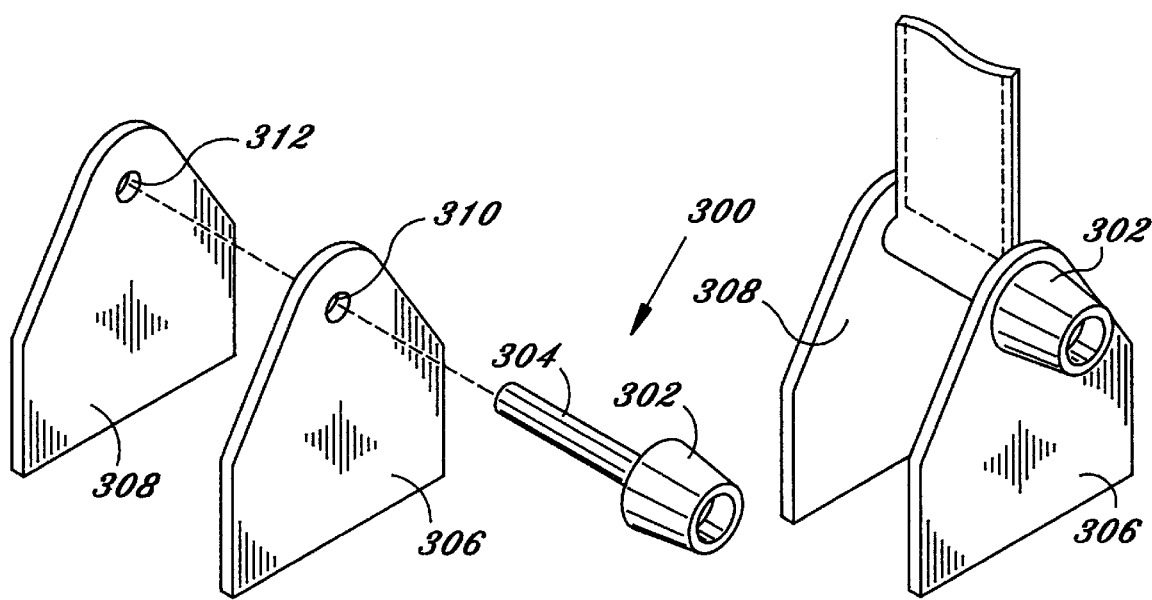
Fig. 11a
Fig. 11b
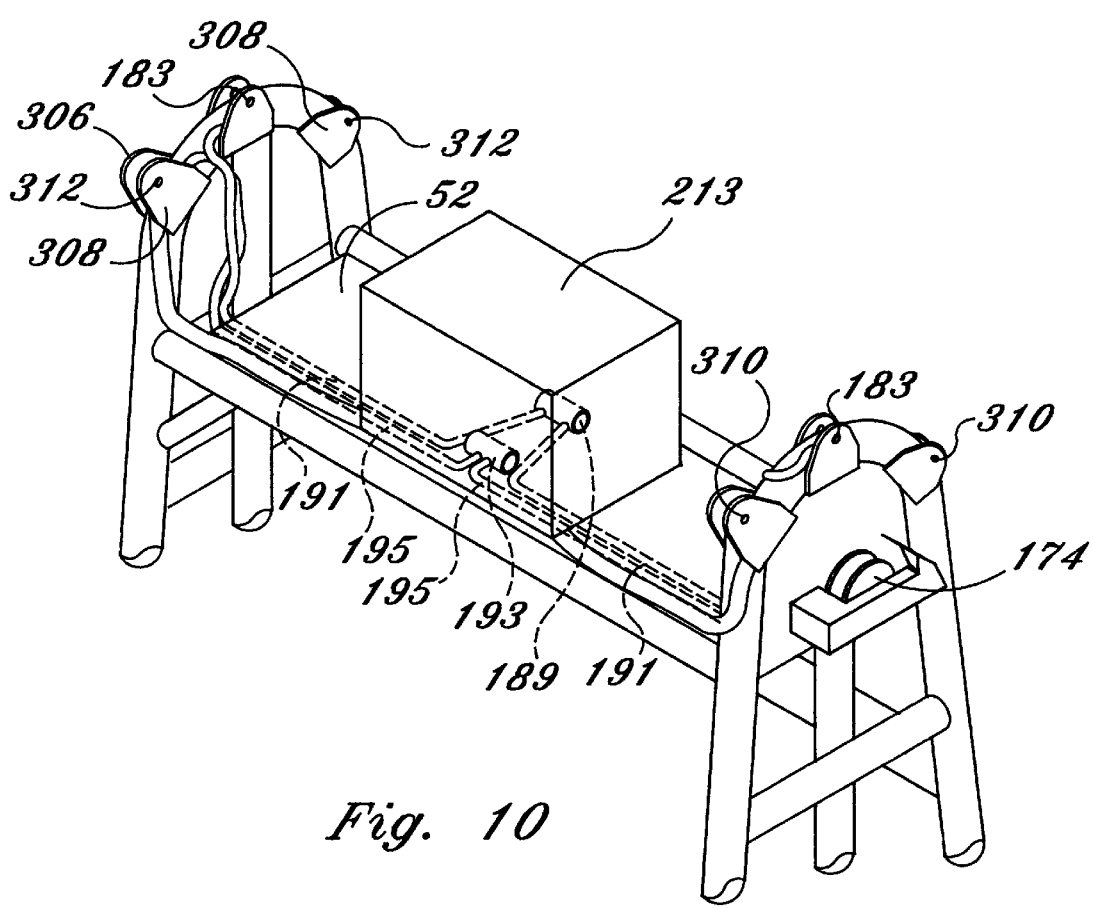
Fig. 10

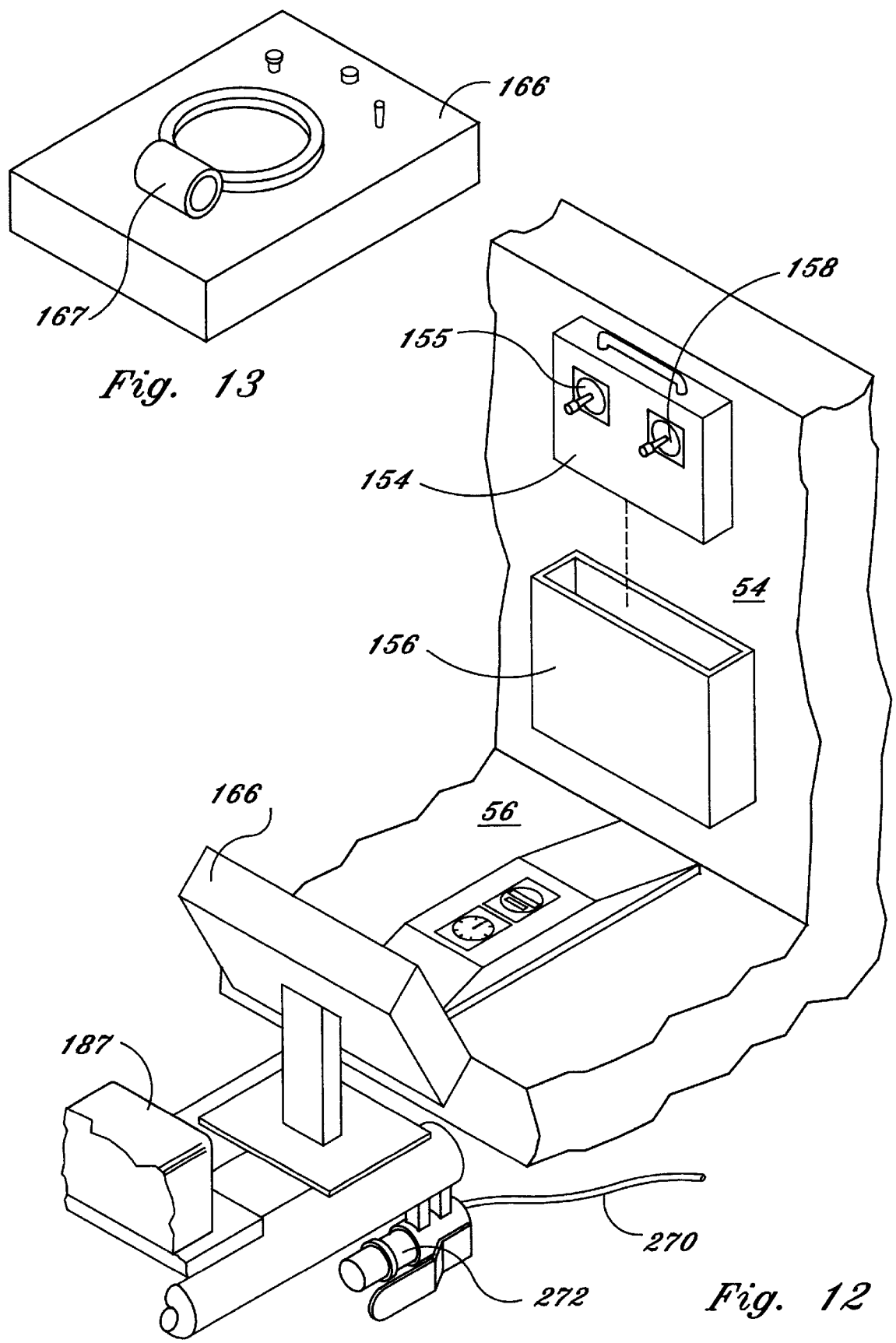

PERSONNEL GUIDED AERIAL DELIVERY DEVICE

BACKGROUND OF THE INVENTION

1. Field of the Invention

The present invention relates generally to aerial delivery device and, more particularly, to a personnel guided aerial delivery device which delivers a plurality of personnel or a combination of personnel and equipment to a specific target area.

2. Description of the Prior Art

Aerial tandem systems have been utilized in the past wherein two people, or a single person and up to two-hundred (200 lbs) pounds of equipment are placed into a specified or predetermined area via a ram air parachute. However, the prior art has been limited in its ability to delivery, from an aircraft, more than two people and/or equipment to a specific area with a single parachute. What is needed in the art is a aerial delivery device which can delivery a plurality of personnel and/or equipment to a specific target area with the use of a single parachute. It is, therefore, to the effective resolution of the aforementioned problems and shortcomings that the present invention is directed.

SUMMARY OF THE INVENTION

The present invention provides a personnel guided aerial delivery device which can be used to safely and precisely deliver personnel, cargo, or a combination of both from an aircraft in flight, to a precise target or location. In the preferred embodiment, the aerial delivery device generally consists of a large "ram-air" type gliding parachute, a "drogue" parachute, an encapsulated crew module, a "fly-by-wire" control system, and a landing impact attenuation system.

The aerial delivery device can employ an onboard human pilot to navigate the module. The use of a skilled pilot allows the aerial delivery device to be guided to a designated landing site. The pilot and personnel can be encapsulated within a crew module which provides protection to the occupants during exit from the aircraft, descent and the landing phase of the flight. The crew module can preferably include safety devices such as a fully protective roll cage, padded seats, headrest, a four point seat belt system for each occupant, and an emergency bailout parachute also for each occupant. The crew module is designed such that each occupant can easily egress the module in flight in the event of an emergency.

The encapsulated crew module incorporates an impact attenuation member which absorbs landing shocks at impact reducing the possibility of injury to one or more of the occupants or cargo. The impact attenuation member generally consists of two skid assemblies which are mounted to air shocks. Each skid assembly includes a fixed outer skid member and an inner movable skid member. The fixed outer skid members are the lower part of the crew module frame. The air shocks are attached to shock mounts which are located under the frame assembly of the crew module. The inner skid members are restricted to movement only in an up/down direction by means of one trailing pivot arm and two horizontal pivot arms associated with each inner skid member.

The right and left inner skid members are independently controlled by means of air lines that extend from the shock assemblies to a pair of valves located within reach of the pilot. A ground support vacuum pump is attached to the valves. Evacuation of air from the system causes one or both of the skids to be raised to its uppermost position. The valve is then closed and the vacuum pump removed. In flight the operator opens the valve allowing air to enter the system while gravity pulls the skid and shock assembly to full extension. The valves can be adjusted to a predetermined position dependent upon the total weight of the aerial delivery device. Upon impact (ground contact) the shocks provide an initial cushion and then the air bleeds out through the valve assembly. Adjusting the valve(s) opening provides more or less shock absorbing effect.

The landing/impact assembly is reusable and as discussed above generally consists of a set of preferably aluminum skids with a drag link suspension design, supported by pneumatic shocks. During flight preparation procedures a lightweight ground support vacuum support vacuum pump is attached to the aerial device and used to raise the landing skids. A valve is then closed and the pump removed. As the skids are in their retracted position, they do not interfere with any ground handling procedures or the loading of the aerial device into the aircraft.

During flight the valve is opened by the pilot, allowing air to enter the system (through associated hose lines). This permits the skids to automatically lower into landing position below the fixed outer skids. Upon ground contact (landing) the valve meters the amount of air allowed to exit the system, providing impact attenuation without rebound. The valve's restriction can be adjusted to provide optimum impact attenuation for a variety of payload weights.

The fly-by-wire control system allows the operator to steer the main parachute utilizing a joystick to negotiate control input. The electro/mechanical control system is required due to the physical force required to turn and flare the large ram-air parachute. The control system generally consists of rechargeable batteries, servo motors and gearboxes, control electronics, a joystick input device, and a power distribution/monitoring system. Operation of the unit is achieved by first switching on the master power and then initiating control input via the joystick. This causes the parachute's steering control lines to be reeled in and out by spools that are attached to the servo motors. The exact position of the spools are monitored by the control electronics via a feedback device. The spool position is ultimately matched to that of the joystick which results in a one hundred (100%) proportional control system. As steering is effectuated by use of the joystick and ultimately by the servo motors, no physical strength is required to control or steer the parachute.

The use of the joysticks to navigate allows the pilot to guide the crew module despite the enormous control stroke and forces required to adequately turn and flare the large ram-air parachute. Preferably the two servo motors are high torque permanent magnet DC type which are coupled to planetary gearheads to provide the needed power. The winch spool attached to the output shaft of each gearhead meters the canopies lower control lines in and out providing precision control. The control electronics precisely monitor the exact position of the winch spool and match it to the position of the joystick. This equates to a one hundred (100%) percent proportional control system. Preferably, the pilot can manipulate the control lines in an infinite number of positions between zero (0") and a preset (adjustable) end position, allowing for precision navigational control.

Once the crew module exits the aircraft, it is held in a stable attitude during freefall descent by a stabilization drogue parachute. The drogue parachute is similar to those utilized for stabilizing tandem rigs. The drogue parachute is deployed automatically by a static line as the aerial delivery device leaves the aircraft. The drogue parachute reduces the terminal velocity of the aerial delivery device and stabilizes the crew module for the remainder of the freefall descent. When a predetermined parachute opening altitude is reached, the drogue release is activated manually by the pilot, or automatically by an AAD or cutter, starting the deployment sequence of the main parachute. Once the main canopy is deployed the drogue parachute is fully collapsed thereby reducing drag and not hindering main parachute performance.

One drogue parachute collapsing device which can be utilized is shown in U.S. Pat. No. 4,399,969. However, other drogue parachute collapsing can be utilized and are considered within the scope of the invention.

No components are lost during deployment allowing the entire aerial device to be reused without having to replace any parts. When the main canopy is deployed, the pilot release the deployment brakes and powers up the device's electrical system in preparation for guidance input as discussed above and below.

Preferably, the main parachute is a large, highly maneuverable/steerable ram-air gliding type canopy similar to those already in existence but relatively much larger in size due to the weight of the load the canopy is supporting. Sizes for the canopy can range from several hundred to several thousand square feet depending on the total payload weight and type of performance desired. Where an on-board pilot is utilized, the landing accuracy of the parachute reaches its full potential.

The present invention aerial delivery device can be dropped from an approximate maximum altitude of at least thirty-thousand (30.000) feet, while being able to flare and land within ten (10) meters of a specified target area. Furthermore, the aerial delivery device is reusable and can successfully accommodate a wide variety of payload weights. Furthermore, different size main parachutes can be utilized with the crew module depending on the desired payload weight. The crew module is designed such that after landing the module will always be in an upright position.

Accordingly, it is an object of the present invention to provide a personnel guided aerial delivery system which can accommodate a relatively significant payload weight.

It is another object of the present invention to provide a personnel guided aerial delivery system which can be landed within a relatively short distance from a specified target area.

It is still another object of the present invention to provide a personnel guided aerial delivery system which provides encapsulated protection for its occupants during exit, descent and landing.

It is yet another object of the present invention to provide an aerial delivery system which is controlled by an occupant.

It is an even further object of the present invention to provide an aerial delivery system which is reusable and requires relatively minimum maintenance.

It is a further object of the present invention to provide an aerial delivery system which is rigger friendly and requires no special packing tools or techniques.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which:

FIG. 6 is a cutaway perspective view of one side of the landing assembly in accordance with the present invention;

FIG. 7 is a rear view of the landing assembly shown in cutaway in FIG. 6;

FIG. 10 is a perspective view of the parachute mounting platform of the crew module illustrating the drogue parachute release and main canopy deployment releases;

FIG. 11a is an exploded perspective view of the riser line attachment member in accordance with the present invention;

FIG. 11b is a perspective view illustrating the attachment of a riser line to the crew module;

FIG. 12 is a cutaway view of a portion of the crew module illustrating the location of the control box and power distribution console and other components in accordance with the present invention;

FIG. 13 is a perspective view of the power distribution console; and

DESCRIPTION OF THE PREFERRED EMBODIMENTS

Figure 1:
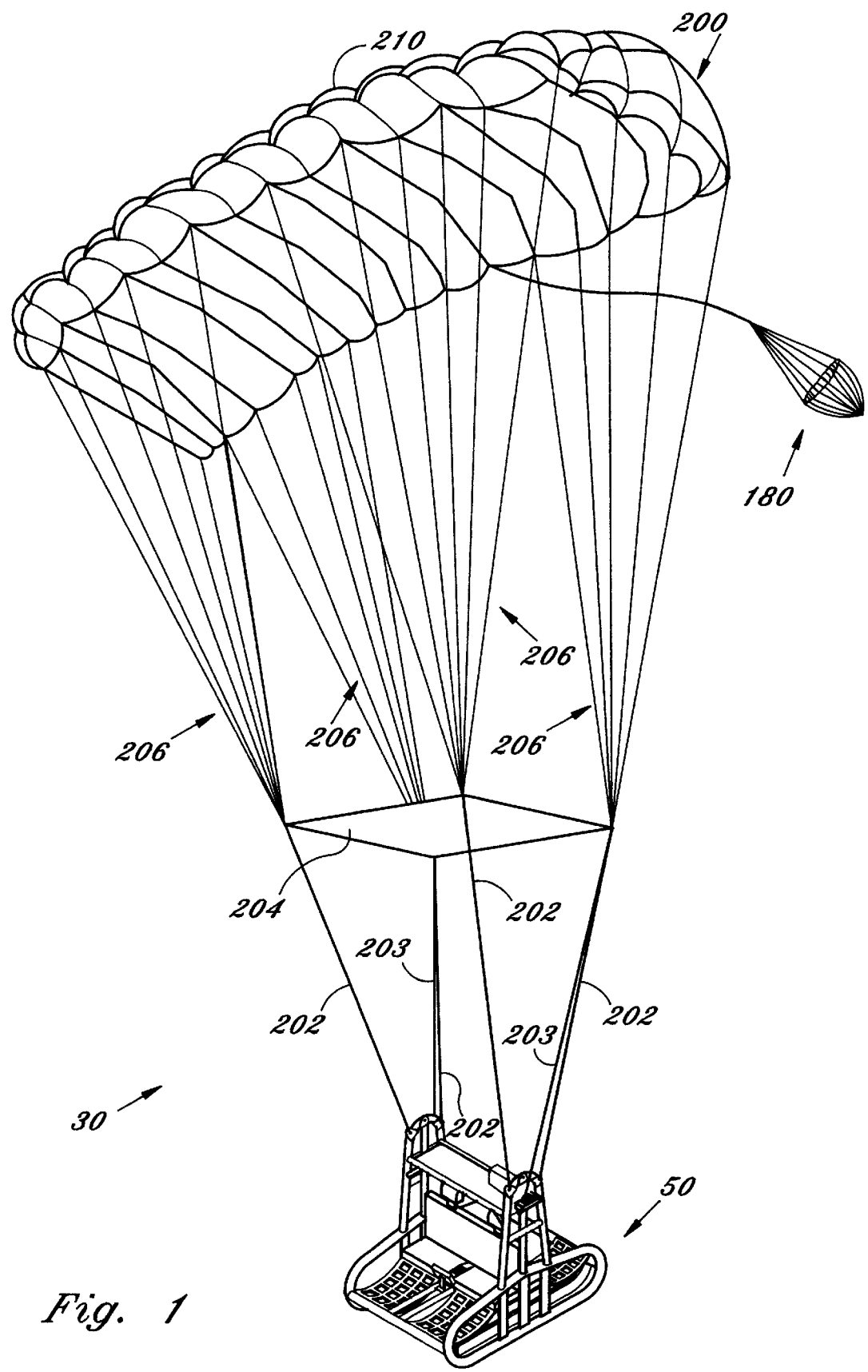
FIG. 1 is a perspective view of a personnel guided aerial delivery device in accordance with the present invention shown in use.

As seen in the drawings a personal guided aerial delivery device in accordance with the present invention is shown and generally referenced as device 30. Aerial delivery device 30 generally consists of a large "ram-air" type gliding parachute 200, a "drogue" parachute 180, an encapsulated crew module 50, a "fly-by-wire" control system 140, and a landing impact attenuation system 250.

Prior to drop-off, aerial delivery device 30 is housed within an aircraft and is attached to the aircraft through a three-ring release mechanism, such as the three-ring release mechanism disclosed in U.S. Pat. No. 4,337,913 issued to Booth. The disclosure of U.S. Pat. No. 4,337,913 is incorporated herein by reference. However, it should be understood that the present invention is not limited to any specific release mechanism, and other conventional release mechanisms can be utilized and are considered within the scope of the invention.

The intended occupants and/or payload are safely secured within encapsulated crew module 50 of device 30, as will be discussed in detail below, preferably after device 30 has been loaded within the aircraft. Preferably, the aircraft is provided with alignment tracks, which are preferably coated with a slippery substance such as TEFLON. However, other substances can be utilized and are considered within the scope of the invention.

When it is desired to drop device 30, the exit doors of the aircraft are opened, by conventional means, and the pilot of crew module 50 activates a release handle 167 which releases the attachment of device 30 to the aircraft and allowing device 30 to slide on the coated alignment tracks. The alignment tracks guide device 30 straight out of the aircraft, usually the rear of the aircraft. A static line lanyard (not shown) is attached at one end to the aircraft and at the other end to a drogue parachute 180. Prior to deployment drogue parachute 180 is housed within container 187 which is attached to module 50.

As device 30 leaves the aircraft, the static line lanyard deploys drogue parachute 180. Alternatively, drogue parachute 180 can be utilized to extract device 30 from the aircraft. Drogue parachute 180 can be any one of a number of design types including, ribbon, cross, ringslot, ringsail, ballute, etc. Drogue parachute 180 can be of different sizes depending on the total weight of the payload. Drogue parachute 180 includes a pair of drogue attachment lines 182 which are attached at reference numeral 183 to the top sides of crew module 50 by a three ring release or other conventional release mechanisms.

Figure 2:
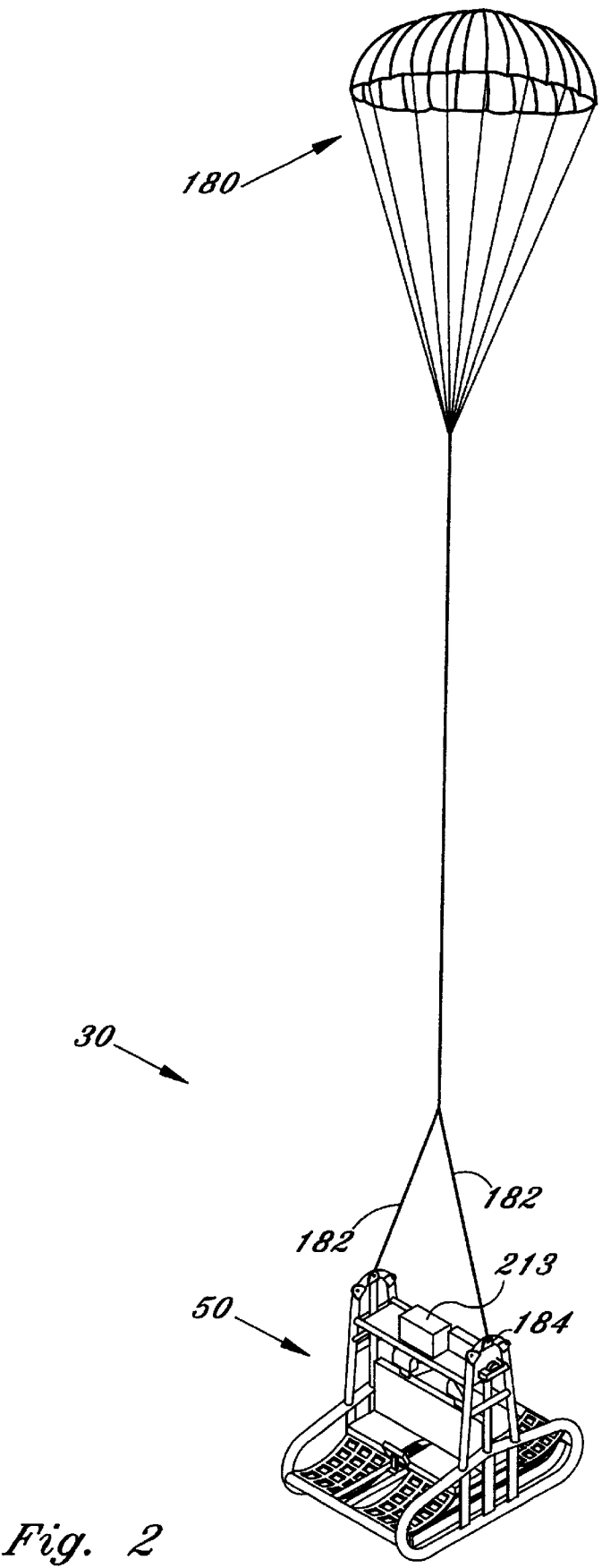
FIG. 2 is a perspective view of the personnel guided aerial delivery device shown in use during initial descent.

Drogue parachute 180 reduces the terminal velocity of aerial delivery device 30 and stabilizes crew module 50 for the remainder of the freefall descent (FIG. 2). Drogue parachute 180 properly positions device 30 during initial descent. When a predetermined parachute opening altitude is reached, drogue parachute 180 is then used to deploy main parachute 200. The pilot or operator manually activates a drogue release 189 on crew module 50, which starts the deployment sequence of main parachute 200. Drogue release 189 is in communication with attachment lines 182 of drogue parachute 180 through wires or cables 191 running underneath the top parachute mounting platform of crew module 50. Alternatively, the deployment sequence can be automatically initiated by a conventional AAD or cutter. Drogue parachute 180 can also be utilized to extract the vehicle from the aircraft.

Once main canopy 200 is deployed, drogue parachute 180 is fully collapsed via a deflation line, similar to the deflation line shown in U.S. Pat. No. 4,399,969. The teaching of a drogue parachute can be found in U.S. Pat. No. 4,399,969, the disclosure of this patent is incorporated herein by reference. The collapsed drogue parachute 180 remains attached to main canopy 200 by conventional means. Thus, no components are lost during the deployment of main parachute 200.

Once canopy 200 is fully deployed, the pilot releases deployment brakes 193 and powers up device 30's electrical system in preparation for guidance input in order to steer crew module 50 to its intended landing area. Deployment brakes 193 is in communication with riser lines 202 of canopy 200 through wires or cables 195 running underneath the parachute mounting platform of crew module 50. Furthermore, once the parachute is deployed, a modular engine and propeller, which is preferably installed before the drop, could be started and used to extend the glide capabilities.

Figure 4:
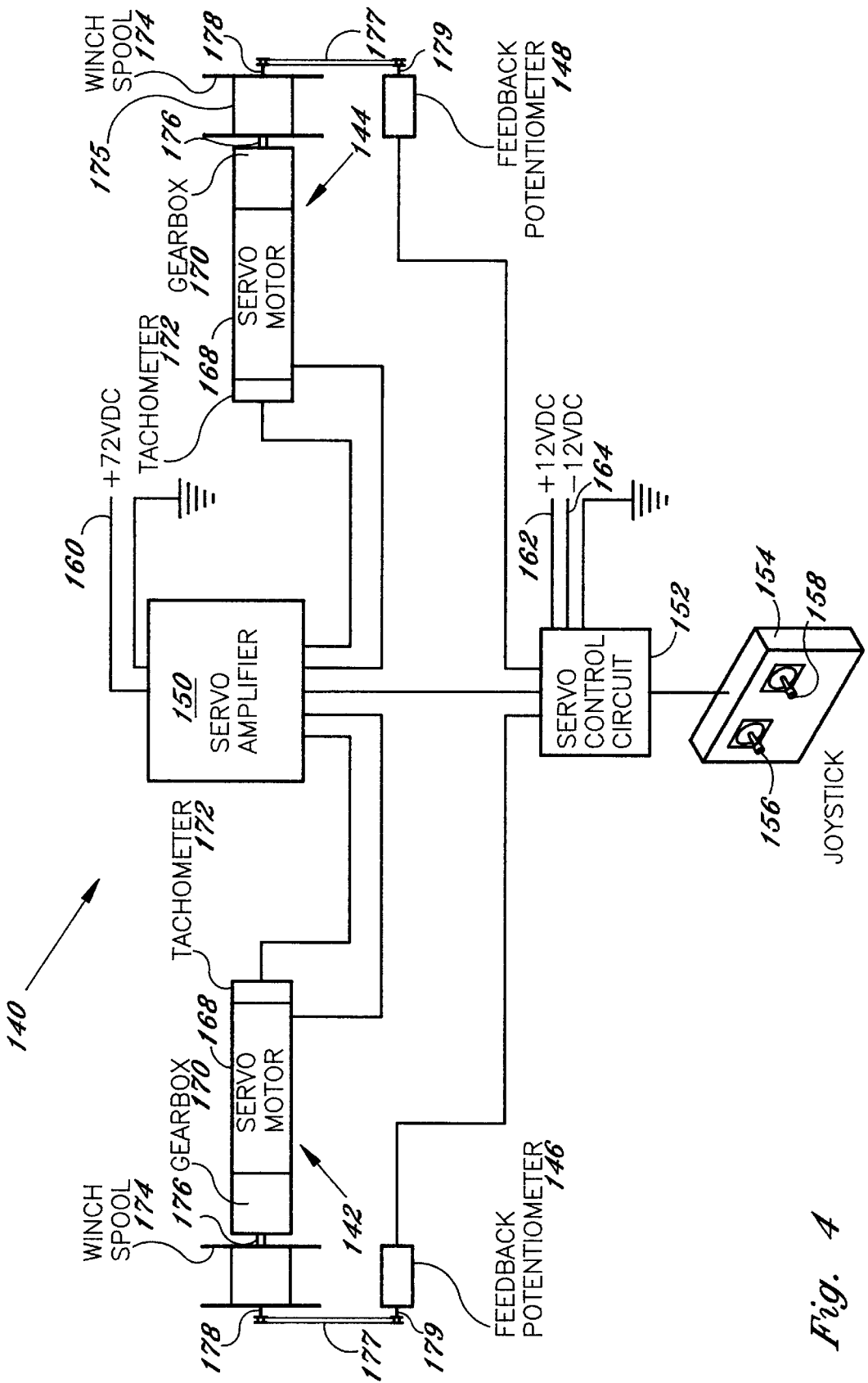
FIG. 4 is a block diagram of the guidance control system in accordance with the present invention.
Figure 5:
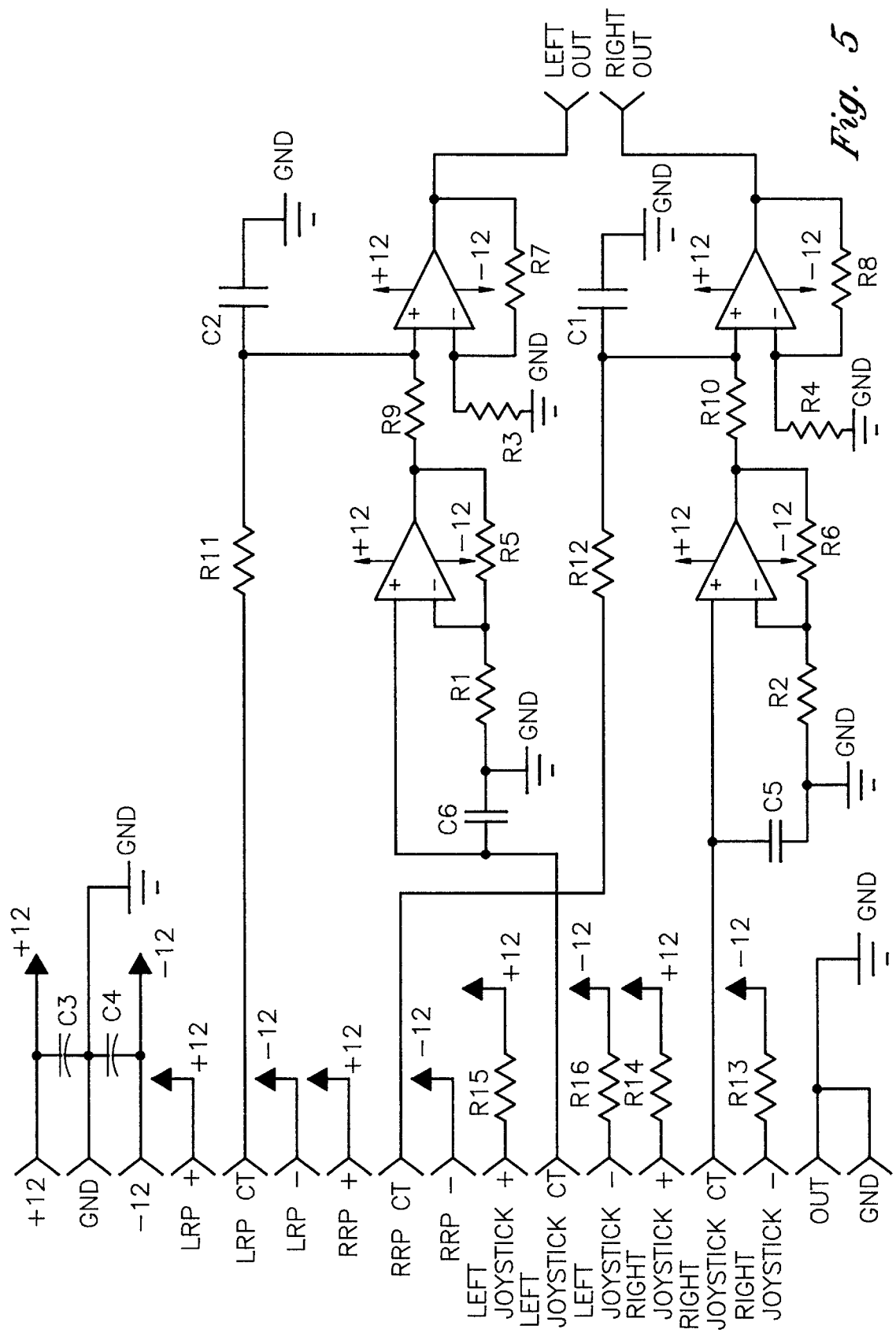
FIG. 5 is a electrical schematic of the servo control circuit of the guidance control system.

FIG. 4 illustrates the "fly-by-wire" guidance control system 140 of the present invention. The means for steering can also be interfaced with a global positioning system for autonomous navigation. Guidance control system 140 generally consists of a left servo motor assembly 142; a right servo motor assembly 144; a first feedback potentiometer 146 associated with left servo motor assembly 142; a second feedback potentiometer 148 associated with right servo motor assembly 144; a two channel servo amplifier 150; a servo control circuit 152; a control box 154 including a pair of joysticks 156 and 158; power sources 160, 162 and 164; and a power distribution console 166.

Motor assemblies 142 and 144 each consist of a motor member 168, planetary gearbox 170 and a tachometer 172. Winch spools 174 are attached to outer shaft member 176 of gearbox 170 by conventional means. Winch spools 174 are provided with an outer shaft member 178. Feedback potentiometer 146 and 148 are also provided with an outer shaft members 179 which can be similar to outer shaft members 176 of winch spools 174. Left and right cog-belt members 177 are each disposed around respective shaft members 179 and 176 to provide a mechanical link between winch spool 174 and respective feedback potentiometers 146 and 148 to provide position information ultimately to servo control circuit 152, as will be discussed in detail below.

In one embodiment, servo amplifier 150 is a conventional Mosfet-type amplifier. However, other amplifiers which can provide raw power to run motor assemblies 142 and 144 can be utilized and are considered within the scope of the invention.

Figure 14:
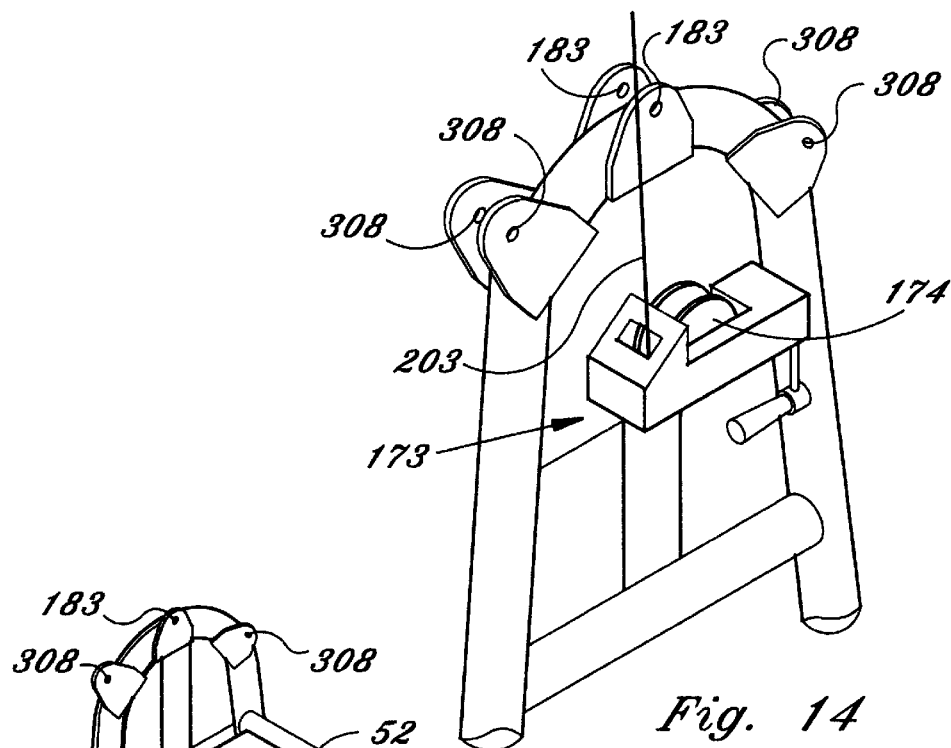
FIG. 14 is a perspective view illustrating the riser line attachment members and the winch spool used to attached the steering lines in accordance with the present invention.
Figure 3:
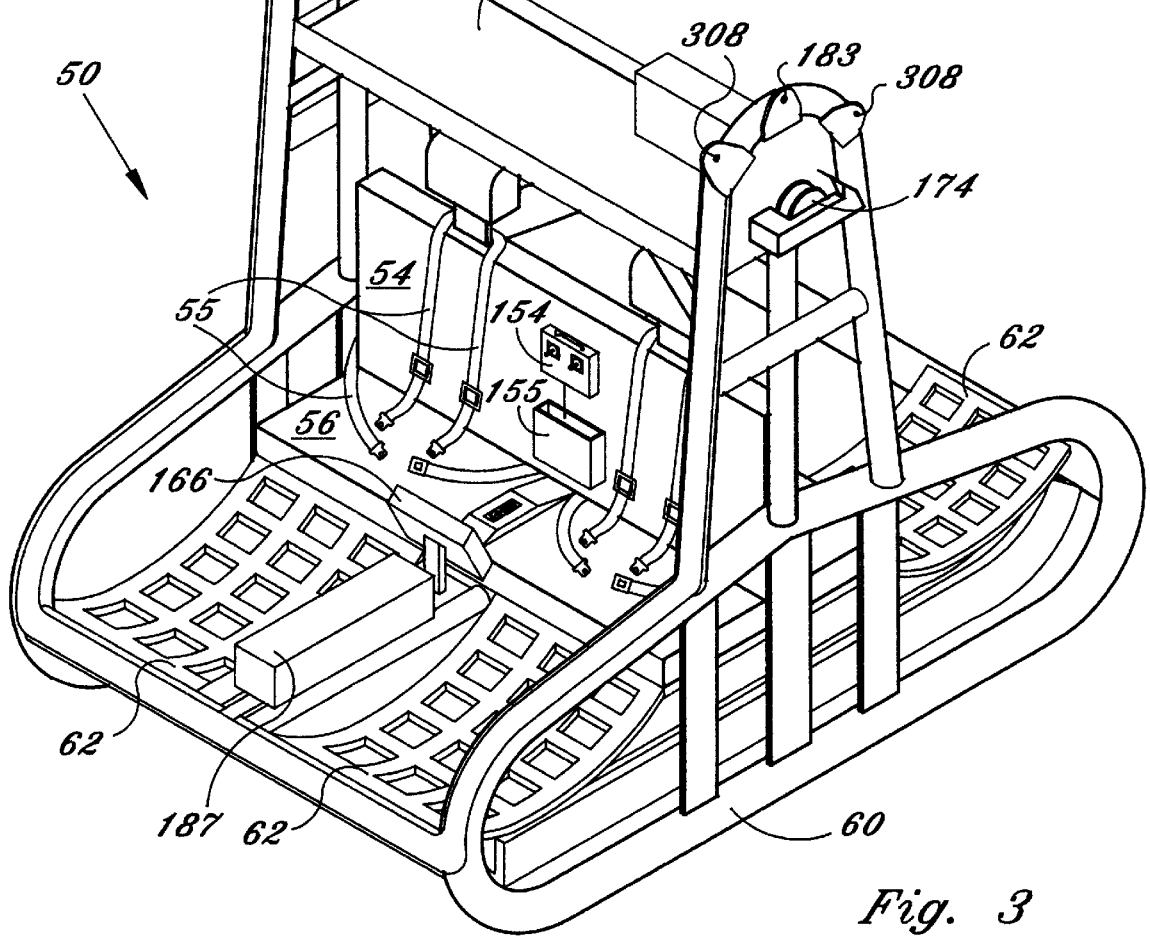
FIG. 3 is a perspective view of the crew module in accordance with the present invention.

In operation, right and left machined winch spools 174 and are attached to output shafts 176 of respective gearboxes 170. Based on information received from servo amplifier 150, servo motor 142 and/or 144, via associated gearbox 170, turns associated winch spool 174 either in a clockwise or counterclockwise direction. The parachute's steering lines 203 are attached to spools 174 by conventional means. Steering lines 203 are attached around a spool member 175 of winch 174 and are fed through guides 173 (FIG. 14). The movement of winch spool(s) 174, by motor assemblies 142 and/or 144 causes steering lines 203 to wind in and/or out. Servo amplifier 150 provides raw power to motor assemblies 142 and 144 upon receipt of a control signal from servo control circuit 152. Amplifier 150 is powered by power source 160, which preferably provides +72V D.C. to amplifier 150. However, this value is not limiting and the amount of power supplied to the amplifier may vary depending on the nature of the amplifier selected, as well as its intended use.

Joysticks 156 and 158 are operated by the pilot/operator to steer aerial delivery device 30 to its intended location. In use, control box 154 is preferably held by the pilot and/or rest upon the pilot's lap area. When not in use, control box 154 can be disposed within a pocket member 155 associated with crew module 50, which is preferably within arm's reach of the pilot.

Servo control circuit 152 constantly monitors an analog voltage being emitted from circuitry associated with joysticks 156 and/or 158 located inside the operator/pilot's control box 154. Simultaneously, servo control circuit 152 also monitors an analog voltage being emitted from feedback potentiometers 146 and/or 148 for comparison with information received from the joystick circuitry. When a discrepancy is detected between the two received information, a signal is generated and sent to servo amplifier 150. This signal varies in amplitude depending on how far way the position of feedback potentiometer 146 and/or 148 is from the position of joystick 156 and/or 158, respectively.

If there is only a minor difference, the amplitude can be relatively weak and servo amplifier 150 sends a correspondingly lower voltage to servo motor assembly 142 and/or 144. Motor assemblies 142 and/or 144, upon receipt of the voltage from servo amplifier 150, turns its associated motor member 168 and attached winch spool 174 correspondingly slowly until it reaches a point where feedback potentiometer 146 or 148 is emitting the same voltage as joystick 156 or 158, respectively.

If a major difference is detected, the amplitude sent by servo control circuit 152 to amplifier 150 can be relatively high. In this situation, amplifier 150 sends a full voltage signal to motor assembly 142 and/or 144, which causes motor member(s) 168 to quickly move to the desired location. As the position of servo motor 168 approaches the position requested or indicated by respective joystick 156 or 158, motor assembly 142 or 144 slows and ultimately stops.

Whether or not a minor or major difference is detected, once the position information from feedback potentiometer 146 or 148 and respective joystick 156 or 158 correspond, servo control circuit 152 cuts off the control signal to servo amplifier 150, which in turn cuts off the signal to the associated motor assembly 142 or 144.

Feedback potentiometers 146 and 148 are also driven by the movement of their associated winch spools 174, due to the attachment of respective cog belts 177 at outer spool axis/shaft 178 and outer potentiometer axis shaft 179. Potentiometers 146 and 148 provide precise information to servo control circuit 152 regarding the position of winch spools 174. The various components of guidance control system 140 are in communication with each other by conventional, such as electrical wiring where appropriate and conventional mechanical attachment means where appropriate.

The movement of joysticks 156 or 158, which in turns causes the movement motor assemblies 142 or 144, respectively, and associated winch spool 174, allows the crew module 50 to be steered and guided to the intended destination, as steering lines 203 associated with main canopy 200 are connected to winch spools 174. Thus, the ultimate movement of winch spool(s) 174, by corresponding movement of joystick 156 and/or 158, causes steering lines 203 to correspondingly move, to guide crew module 50 to its destination.

"Fly-by-wire" control system 140 allows the operator to steer main parachute 200 utilizing joysticks 156 and/or 158 to negotiate control input. Electro/mechanical control system 140 is required due to the physical force required to turn and flare large ram-air parachute 200. Operation of the unit is achieved by first switching on the master power and then initiating control input via joystick(s) 156 and/or 158. This causes steering control lines 203 to be reeled in and out by associated spools 174 that are attached to servo motor assemblies 142 and 144. As stated above, the exact position of spools 174 are monitored by the control electronics via a feedback device (i.e. potentiometers 146 and 148). Spool 174's position is ultimately matched to that of its associated joystick 156 or 158, which results in a one hundred (100%) proportional control system. As steering is effectuated by use of joysticks 156 and/or 158, no physical strength is required to control or steer parachute 200.

In lieu of the predominantly analog control system 140, described above, a digital control system can be utilized with the present invention and is considered within the scope of the invention. In the digital embodiment, potentiometers 146 and 148 can be replaced with optical encoders and servo control circuit 152 can be replaced with a digital type control.

Encapsulated crew module 50 provides protection to the occupants during exit from the aircraft, descent and the landing phase of the flight. Crew module 50 can preferably include safety devices such as a fully protective roll cage, padded seats, headrest, a four point seat belt system (generally designated reference numeral 55 and similar to U.S. Pat. No. 4,850,554, the disclosure of this patent is incorporated herein by reference) for each occupant, and an emergency bailout parachute also for each occupant. The crew module is designed such that each occupant can easily egress module 50 in flight in the event of an emergency, with the occupant's emergency bailout parachute being worn at all times by the occupant in the event of bailout.

Crew module 50 generally consists of a parachute mounting platform 52, occupant area 54, preferably including a plurality of seats 56, and lower frame member 60. As seen, preferably four (4) seats 56 are provided (two (2) on each side of module 50). Alternatively, crew module 50 can be designed around a single pilot and a payload of cargo resulting in a configuration modified from the four seat version shown in the drawings. Additionally, crew module 50 can include seating for two or three passengers and an associated area designed for cargo. Other module design arrangements and modifications are also possible. All of these module design arrangements and modifications are considered within the scope of the invention.

A mesh foot area 62 can also be provided. Crew module 50 is also provided with an emergency parachute, to allow module to be landed with minimal damage, so it can still be reused. In such an emergency the pilot pulls a handle to release the emergency parachute after a ten second delay. When not in use, control box 154 is disposed within pocket 155 attached to crew module 50.

Encapsulated crew module 50 incorporates an impact attenuation member 250 which absorbs landing shocks at impact reducing the possibility of injury to one or more of the occupants or cargo. Impact attenuation member 250 generally consists of two skid assemblies which are each mounted to respective front and rear air shocks 252 and 254, respectively, provided on each side of crew module 50. Each skid assembly includes a fixed outer skid member 61 and an inner movable skid member 260.

Fixed outer skid members 61 are the lower part of the crew module frame. The air shocks are attached to shock mounts 262 which are located under the frame assembly of the crew module. Inner skid members 260 are restricted to movement only in an up/down direction by means of one trailing pivot arm 264 and two horizontal pivot arms 266 associated with each inner skid member 260.

Figure 8:
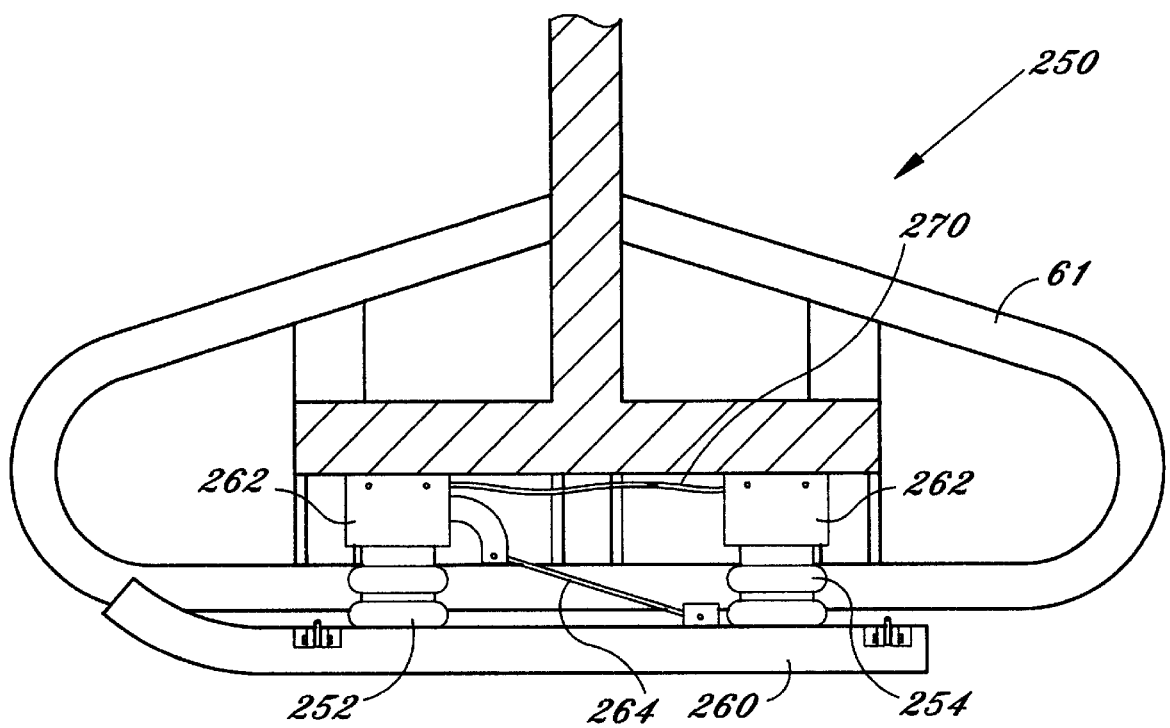
FIG. 8 is a side view of one landing assembly shown in a fully extended position.
Figure 9:
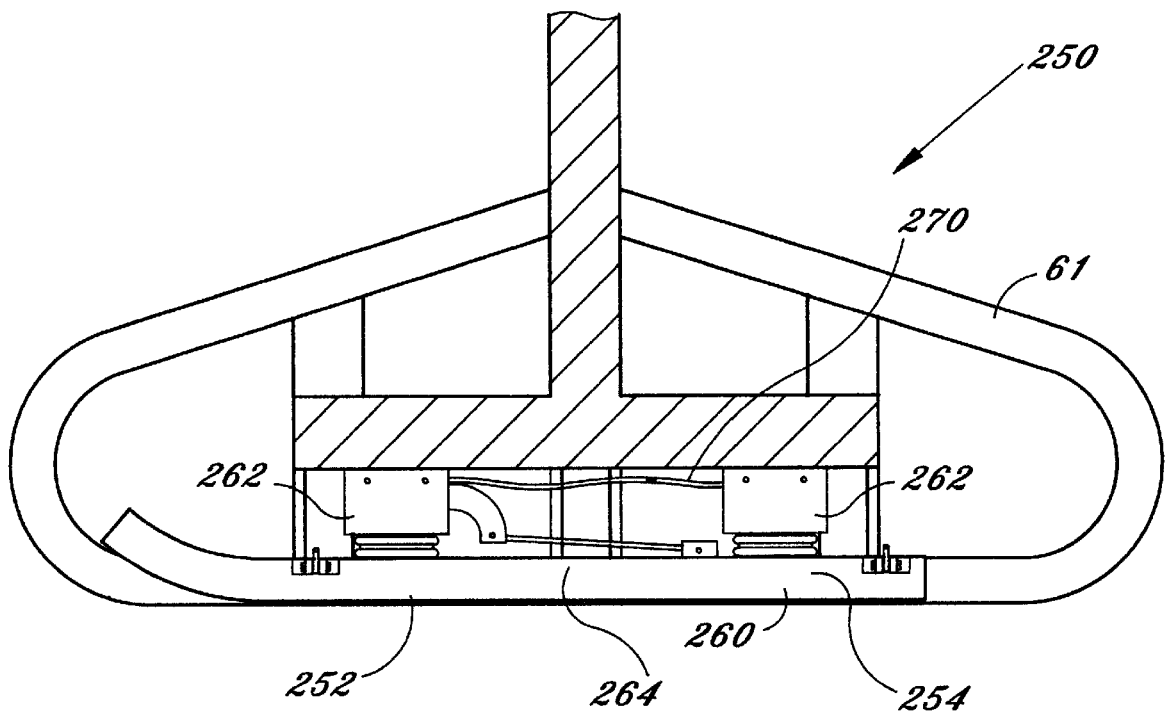
FIG. 9 is a side view of one landing assembly shown in a fully retracted position.

Right and left inner skid members 260 are independently controlled by means of air lines 270 that extend from the shock assemblies to a pair of valves 272 located within reach of the pilot. A ground support vacuum pump 280 is attached to the valves 272. Evacuation of air from the system causes one or both of inner skids 260 to be raised to its uppermost position (FIG. 9). The valve is then closed and the vacuum pump removed. In flight the operator opens the valve allowing air to enter the system while gravity pulls the skid and shock assembly to full extension (FIG. 8). Valves 272 can be adjusted to a predetermined position dependent upon the total weight of aerial delivery device 30. Upon impact (ground contact) the shocks provide an initial cushion and then the air bleeds out through the valve assembly. Adjusting the valve(s) opening provides more or less shock absorbing effect.

Preferably, main parachute 200 is a large, highly maneuverable/steerable ram-air gliding type canopy similar to those already in existence but relatively much larger in size due to the weight of the load the canopy is supporting. Sizes for the canopy can range from several hundred to several thousand square feet depending on the total payload weight and type of performance desired. Where an on-board pilot is utilized, the landing accuracy of the parachute reaches its full potential. Canopy 200 has riser attachment lines 202 which are attached to the top sides of crew module 50 by conventional means such as pins 300.

A slider 204 is provided to gradually transverses the spreading of suspension lines 206 during the deployment of canopy 200 which slows the down the inflation of canopy 200 to prevent potentially dangerous explosive openings of canopy 200.

Each riser line 202 is preferably attached to the top of crew module 50 through the use of a pin 300 which is associated with apertures 310 and 312 of plate member 306 and 308, respectively. Plate members 306 and 308 are preferably constructed integral with module 50. During attachment, stem 304 is inserted through aperture 310, a loop formed at the end of line 202 and finally through aperture 312, causing pin 300 to be locked in place by conventional means. When properly positioned, pin head 302 should be closely adjacent or abutting the outer surface of plate 306 (FIG. 11).

The present invention aerial delivery device 30 can be dropped from an approximate maximum altitude of at least thirty-thousand (30.000) feet, while being able to flare and land within ten (10) meters of a specified target area. Furthermore, aerial delivery device 30 can be reusable and can successfully accommodate a payload weight range from hundreds to thousands of pounds.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A personnel guided aerial delivery device, said aerial delivery device capable of delivering one or more occupants and/or cargo to a designated landing area, comprising:
   an open crew module having no enclosures and a plularity of seats with at least two seats divided and at least one seat facing a first direction and a second seat facing a second opposite direction having an open during flight occupant seating area;
   a parachute member attached to said crew module;
   means for stabilizing said crew module during initial freefall of said crew module;
   an independently controlled landing impact attenuation member disposed at the bottom of said crew module; and
   means for steering said parachute member.

2. The personnel guided aerial delivery device of claim 1 wherein said means for stabilizing is a drogue parachute member attached to said parachute member.

3. The personnel guided aerial delivery device of claim 1 wherein said crew module is encapsulated to provide protection to the one or more occupants and/or cargo.

4. The personnel guided aerial delivery device of claim 2 wherein said drogue parachute is activated by dropping said device out of an in flight aircraft.

5. The personnel guided aerial delivery device of claim 1 wherein said parachute member is of a gliding parachute type.

6. The personnel guided aerial delivery device of claim 1 wherein said landing impact attenuation member comprises:
   a pair of movable skid members, a first of said movable skid members disposed at a first side of said crew module and a second of said movable skid members disposed at a second side of said crew module;
   a first pair of shock members associated with said first movable skid member and a second pair of shock members associated with said second movable skid member;
   means for moving said first movable skid member in a vertical direction; and
   means for moving said second movable skid member in a vertical direction.

7. A personnel guided aerial delivery device, said aerial delivery device capable of delivering one or more occupants and/or cargo to a designated landing area, comprising:
   a crew module;
   a parachute member attached to said crew module;
   means for stabilizing said crew module during initial freefall of said crew module;
   a landing impact attenuation member disposed at the bottom of said crew module; and
   means for steering said parachute member;
   wherein said landing impact attenuation member comprises:
      a pair of movable skid members, a first of said movable skid members disposed at a first side of said crew module and a second of said movable skid members disposed at a second side of said crew module;
      a first pair of shock members associated with said first movable skid member and a second pair of shock members associated with said second movable skid member;
      means for moving said first movable skid member in a vertical direction; and
      means for moving said second movable skid member in a vertical direction;
      wherein said means for moving said first movable skid member and said means for moving said second movable skid member each include:
         an airhose member in communication with a respective shock member; and
         a valve member attached to said airhose member;
         wherein air is either supplied to or withdrawn from said shock members through said airhose member dependent on a desired vertical movement of said skid member.

8. The personnel guided aerial delivery device of claim 1 wherein said means for steering comprises:
   a pair of joysticks operable by an occupant disposed within the seating area of said crew module;
   a pair of steering lines associated with said parachute member;
   a first motor assembly associated with a first of said pair of steering lines;
   a second motor assembly associated with a second of said pair of steering lines;
   means for determining the position of said pair of steering lines;
   control means for adjusting the position of one or more of said steering lines dependent on input received from one or more of said joysticks.

9. The personnel guided aerial delivery device of claim 8, wherein said means for determining is a first feedback potentiometer in communication with the first steering line and a second feedback potentiometer in connection with the second steering line.

10. The personnel guided aerial delivery device of claim 9, wherein said control means compares information received from one or more of said feedback potentiometers with information received from one or more of said joysticks and adjusts one or more of the steering lines in accordance with the received information.

11. The personnel guided aerial delivery device of claim 10, further including amplifying means which communicates with one or more of the motor assemblies dependent on information received from said control means to cause one or more of the motor assemblies to adjust the steering line associated with the motor assembly.

12. The personnel guided aerial delivery device of claim 8 wherein each of said motor assemblies includes a motor member, gearbox and spool member; wherein the steering line associated with the motor assembly is attached to said spool member; wherein the motor member causes said spool member to turn in either a clockwise or counter-clockwise direction which in turns moves the attached steering line to guide said crew module in flight.

13. A personnel guided aerial delivery device, said aerial delivery device capable of delivering one or more occupants and/or cargo to a designated landing area, comprising:

a crew module;

a parachute member attached to said crew module;

means for stabilizing said crew module during initial freefall of said crew module;

a landing impact attenuation member disposed at the bottom of said crew module; and means for steering said parachute member, said means for steering comprises:
a pair of joysticks;
a pair of steering lines associated with said parachute member;
a first motor assembly associated with a first of said pair of steering lines;
a second motor assembly associated with a second of said pair of steering lines;
means for determining the position of said pair of steering lines;
control means for adjusting the position of one or more of said steering lines dependent on input received from one or more of said joysticks;
wherein each of said motor assemblies includes a motor member, gearbox and spool member; wherein the steering line associated with the motor assembly is attached to said spool member; wherein the motor member causes said spool member to turn in either a clockwise or counter-clockwise direction which in turns moves the attached steering line to guide said crew module in flight;
wherein said means for steering further including a first belt member attached to a first spool member and said first feedback potentiometer and a second belt member attached to a second spool member and said second feedback potentiometer.

14. The personnel guided aerial delivery device of claim 1 wherein said crew module including a four point restraint system for each occupant.

15. A personnel guided aerial delivery device, said aerial delivery device capable of delivering one or more occupants and/or cargo to a designated landing area, comprising:

an encapsulated crew module, said crew module including a four point restraint system for each occupant;

a gliding parachute member attached to said crew module;

a drogue parachute for stabilizing said encapsulated crew module during initial freefall of said crew module;

means for steering said parachute member; and a landing impact attenuation means disposed at the bottom of said crew module, said impact attenuation means including:
a pair of movable skid members, a first of said movable skid members disposed at a first side of said crew module and a second of said movable skid members disposed at a second side of said crew module,
a first pair of shock members associated with said first movable skid member and a second pair of shock members associated with said second movable skid member,
means for moving said first movable skid member in a vertical direction, and
means for moving said second movable skid member in a vertical direction;
wherein said movable skid members act as inner skid members and a bottom area of said crew module acts as fixed outer skid members.

16. The personnel guided aerial delivery device of claim 15 wherein said means for moving said first movable skid member and said means for moving said second movable skid member each include:

an airhose member in communication with a respective shock member; and a valve member attached to said airhose member;

wherein air is either supplied to or withdrawn from said shock members through said airhose member dependent on a desired vertical movement of said skid member.

17. The personnel guided aerial delivery device of claim 15 wherein said means for steering comprises:

a pair of joysticks;

a pair of steering lines associated with said parachute member;

a first motor assembly associated with a first of said pair of steering lines;

a second motor assembly associated with a second of said pair of steering lines;

means for determining the position of said pair of steering lines;

control means for adjusting the position of one or more of said steering lines dependent on input received from one or more of said joysticks.

18. The personnel guided aerial delivery device of claim 17, wherein said means for determining is a first feedback potentiometer in communication with the first steering line and a second feedback potentiometer in connection with the second steering line; wherein said control means compares information received from one or more of said feedback potentiometers with information received from one or more of said joysticks and adjusts one or more of the steering lines in accordance with the received information.

19. The personnel guided aerial delivery device of claim 17, further including amplifying means which communicates with one or more of the motor assemblies dependent on information received from said control means to cause one or more of the motor assemblies to adjust the steering line associated with the motor assembly.

20. The personnel guided aerial delivery device of claim 17 wherein each of said motor assemblies includes a motor member, gearbox and spool member; wherein the steering line associated with the motor assembly is attached to said spool member; wherein the motor member causes said spool member to turn in either a clockwise or counter-clockwise direction which in turns moves the attached steering line to guide said crew module in flight.

21. The personnel guided aerial delivery device of claim 20 wherein said means for steering further including a first belt member attached to a first spool member and said first feedback potentiometer and a second belt member attached to a second spool member and said second feedback potentiometer.

22. A personnel guided aerial delivery device, said aerial delivery device capable of delivering one or more occupants and/or cargo to a designated landing area, comprising:

an encapsulated crew module, said crew module including a four point restraint system for each occupant;

a gliding parachute member attached to said crew module;

a drogue parachute for stabilizing said encapsulated crew module during initial freefall of said crew module, said drogue parachute is activated by dropping said device out of an in flight aircraft;

means for steering said parachute member, said steering means including:
a pair of joysticks,
a pair of steering lines associated with said parachute member,
a first motor assembly associated with a first of said pair of steering lines,
a second motor assembly associated with a second of said pair of steering lines,
means for determining the position of said pair of steering lines,
control means for adjusting the position of one or more of said steering lines dependent on input received from one or more of said joysticks; and a landing impact attenuation means disposed at the bottom of said crew module, said impact attenuation means including:
a pair of movable skid members, a first of said movable skid members disposed at a first side of said crew module and a second of said movable skid members disposed at a second side of said crew module,
a first pair of shock members associated with said first movable skid member and a second pair of shock members associated with said second movable skid member,
means for moving said first movable skid member in a vertical direction, and
means for moving said second movable skid member in a vertical direction;
wherein said movable skid members act as inner skid members and a bottom area of said crew module acts as fixed outer skid members.

23. The personnel guided aerial delivery device of claim 22 wherein said means for moving said first movable skid member and said means for moving said second movable skid member each include:
an airhose member in communication with a respective shock member; and
a valve member attached to said airhose member;
wherein air is either supplied to or withdrawn from said shock members through said airhose member dependent on a desired vertical movement of said skid member.

24. The personnel guided aerial delivery device of claim 22, wherein said means for determining is a first feedback potentiometer in communication with the first steering line and a second feedback potentiometer in connection with the second steering line; wherein said control means compares information received from one or more of said feedback potentiometers with information received from one or more of said joysticks and adjusts one or more of the steering lines in accordance with the received information.

25. The personnel guided aerial delivery device of claim 22, further including amplifying means which communicates with one or more of the motor assemblies dependent on information received from said control means to cause one or more of the motor assemblies to adjust the steering line associated with the motor assembly.

26. The personnel guided aerial delivery device of claim 22 wherein each of said motor assemblies includes a motor member, gearbox and spool member; wherein the steering line associated with the motor assembly is attached to said spool member; wherein the motor member causes said spool member to turn in either a clockwise or counter-clockwise direction which in turns moves the attached steering line to guide said crew module in flight.

27. The personnel guided aerial delivery device of claim 26 wherein said means for steering further including a first belt member attached to a first spool member and said first feedback potentiometer and a second belt member attached to a second spool member and said second feedback potentiometer.

28. The personnel guided aerial delivery device of claim 22 wherein said drogue parachute is utilized to extract said crew module from an aircraft.

29. The personnel guided aerial delivery device of claim 22 wherein said means for steering is interfaced with a global positioning system for autonomous navigation of said crew module.

* * * * *